(12) United States Patent
Carrithers et al.

(10) Patent No.: US 11,577,250 B2
(45) Date of Patent: Feb. 14, 2023

(54) PIPETTE-FILLABLE CARTRIDGE

(71) Applicant: Funai Electric Co., Ltd., Osaka (JP)

(72) Inventors: Adam D. Carrithers, Lexington, KY (US); Bruce A. DeBoard, Lexington, KY (US); Michael A. Marra, III, Lexington, KY (US); Sam Norasak, Lexington, KY (US)

(73) Assignee: FUNAI ELECTRIC CO. LTD

( * ) Notice: Subject to any disclaimer, the term of this patent is extended or adjusted under 35 U.S.C. 154(b) by 185 days.

(21) Appl. No.: 17/152,845

(22) Filed: Jan. 20, 2021

(65) Prior Publication Data

US 2022/0226828 A1 Jul. 21, 2022

(51) Int. Cl.
*B01L 3/00* (2006.01)
*G01N 35/10* (2006.01)

(52) U.S. Cl.
CPC .......... *B01L 3/527* (2013.01); *G01N 35/1002* (2013.01); *B01L 2200/026* (2013.01); *B01L 2200/04* (2013.01); *B01L 2200/06* (2013.01); *B01L 2200/0684* (2013.01); *B01L 2300/021* (2013.01); *B01L 2300/043* (2013.01); *B01L 2300/0851* (2013.01)

(58) Field of Classification Search
CPC .............. B01L 3/527; B01L 2200/026; B01L 2200/04; B01L 2200/06; B01L 2200/0684; B01L 2300/021; B01L 2300/043; B01L 2300/0851; B01L 2200/0615; B01L 3/0268; G01N 35/1002; G01N 2035/1039; G01N 35/1016; B41J 2/17533; B41J 2002/17573; B41J 2/17509; B41J 2/1754; B41J 2/17556; B41J 2/17566

See application file for complete search history.

(56) References Cited

U.S. PATENT DOCUMENTS

| | | | |
|---|---|---|---|
| 6,260,961 B1 | 7/2001 | Seu et al. | |
| 7,775,649 B2 | 8/2010 | Silverbrook | |
| 8,057,030 B2 | 11/2011 | Hamano | |
| 8,397,740 B2 | 3/2013 | Price et al. | |
| 9,718,277 B2 | 8/2017 | Kudo et al. | |
| 9,868,290 B2 | 1/2018 | Matsuda et al. | |
| 9,895,692 B2 | 2/2018 | Battrell et al. | |
| 10,124,593 B2 | 11/2018 | Komplin et al. | |
| 10,343,409 B2 | 7/2019 | Higuchi et al. | |
| 2003/0128256 A1* | 7/2003 | Oda | B41J 2/17513 347/85 |
| 2004/0095447 A1 | 5/2004 | Bailey et al. | |

(Continued)

*Primary Examiner* — Jennifer Wecker
*Assistant Examiner* — Oyeleye Alexander Alabi
(74) *Attorney, Agent, or Firm* — Luedeka Neely Group, PC (57) ABSTRACT

A pipette-fillable fluid reservoir body. The fluid reservoir body includes two or more discrete fluid chambers therein. At least one of the fluid chambers contains a pressure compensation device and at least another one of the fluid chambers is devoid of a pressure compensation device. Each of the fluid chambers is in fluid flow communication with a fluid supply via, and each of the fluid chambers have sidewalls and a bottom wall attached to the side walls, wherein the bottom wall slopes toward the fluid supply via. The fluid reservoir body also includes an ejection head support face in fluid flow communication with the fluid chambers for attachment of a fluid ejection device to the ejection head support face for ejecting fluid from the fluid chambers.

14 Claims, 9 Drawing Sheets

(56) References Cited

U.S. PATENT DOCUMENTS

| | | | |
|---|---|---|---|
| 2005/0185037 A1* | 8/2005 | Bailey | B41J 2/17513 |
| | | | 347/86 |
| 2006/0001704 A1 | 1/2006 | Anderson et al. | |
| 2016/0347075 A1* | 12/2016 | Matsuda | B41J 29/13 |
| 2018/0117921 A1* | 5/2018 | Weaver | B41J 2/17513 |
| 2019/0083972 A1 | 3/2019 | Nielsen et al. | |
| 2019/0232668 A1 | 8/2019 | Suzuki et al. | |
| 2020/0217868 A1 | 7/2020 | Anderson, Jr. et al. | |

\* cited by examiner

PIPETTE-FILLABLE CARTRIDGE

TECHNICAL FIELD

The disclosure is directed to chemical or biological assays, such as drug screenings, and in particular to improved fluid reservoir bodies used for chemical and biological assay applications in inexpensive fluid deposition devices.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. Assay analysis of blood, for example, provides a number of different factors that are used to determine the health of an individual. When there are a large number of patients that require blood sample analysis, the procedures may be extremely time consuming. For assay analysis, such as drug screenings, it is desirable to deposit miniscule amounts of target reagents to evaluate their effect and performance on the samples. Traditionally, pipettes— manually or electromechanically actuated—are used to deposit trace substances into these assay samples. The total volume of a test fluid produced for an assay is dictated by the ability to achieve a desired ratio of reagents with respect to the least of the reagents. Due to the small-scale volumetric limitations of pipettes, it is often necessary to create an excess of testing fluid to achieve the proper ratio of reagents.

It is well known that thermal inkjet technology is capable of precisely distributing picolitre-sized droplets of a jetting fluid. The precision and speed offered by inkjet technology makes it a promising candidate for increasing throughput of assay samples while decreasing the amount of wasted sample. In a conventional thermal-jet printer, a jetting fluid is typically prefilled into a printhead before reaching the end-user. However, it is impractical to use a totally prefilled cartridge in the life-sciences field where it is desirable to produce testing solutions on site.

While inkjet printing may be a viable method of administering chemical and biological assay analysis, inkjet printing products currently on the market use specialty printers and specially designed printheads which are cost prohibitive to some researchers. To reduce the cost of manufacturing and cost to the end-user, it is desirable to use pre-existing standard inkjet printers instead of specially designed printing systems. To enable the use of standard inkjet printers in the life science field, it is necessary to modify the printhead fluid reservoir bodies so that the pre-existing fluid reservoir form factors are maintained while allowing the fluid reservoir bodies to be easily filled with custom jetting fluids.

When using inkjet printing technology, the maximum flowrate of fluid from an ejection head is dependent upon the microelectromechanical systems and design of the ejection head, the maximum volume of the fluid cartridge for the ejection head is dependent upon the fluid reservoir size and an ability to prevent fluid from drooling from the ejection head. Drooling, or flooding, is a term used to describe the incessant puddling of a jetting fluid onto the ejection head. Drooling of fluid from an ejection head is a function of fluid properties, ejector chip chemistry, and the hydrostatic pressure of the jetting fluid within the reservoir. Without backpressure control of the fluid in the reservoir, ejection heads are quite limited to the volume of liquid that can be contained in the fluid reservoir without experiencing drooling. While a pipette-fillable fluid ejection heads primarily lends itself to small reagent volumes, there are times where it may be desirable to dispense large volumes of a fluid, such as administering a buffer solution.

In view of the foregoing, an embodiment of the disclosure provides a pipette-fillable fluid reservoir body to which a fluid ejection head substrate is attached. The fluid reservoir body includes two or more discrete fluid chambers therein. At least one of the two or more discrete fluid chambers contains a pressure compensation device and at least another one of the two or more discrete fluid chambers is devoid of a pressure compensation device. Each of the two or more discrete fluid chambers is in fluid flow communication with a fluid supply via, and each of the two or more discrete fluid chambers have sidewalls and a bottom wall attached to the side walls, wherein the bottom wall slopes toward the fluid supply via. An ejection head support face is provided in fluid flow communication with two or more discrete fluid chambers for attachment of a fluid ejection device to the ejection head support face for ejecting fluid from the two or more discrete fluid chambers.

In some embodiments, the sloped bottom wall has an angle ranging from about 6 to about 12 degrees relative to a plane orthogonal to the sidewalls.

In some embodiments, the fluid reservoir body includes four fluid chambers therein, wherein the four fluid chambers are separated from one another by dividing walls therebetween.

In some embodiments, the fluid reservoir body is a transparent fluid reservoir body.

In some embodiments, the fluid reservoir body includes indicia thereon for indicating a maximum fluid fill volume for each of the fluid chambers devoid of a pressure compensation device.

In some embodiments, a cover is fixedly or removably attached to the fluid reservoir body adjacent to each of the fluid chambers containing the pressure compensation device. In some embodiments, the cover further includes a hinged cover section disposed over one or more discrete fluid chambers devoid of a pressure compensation device. In some embodiments, the cover includes air vent channels therein.

In some embodiments, a removable tape is provided for covering the fluid chambers containing the pressure compensation device, the fluid chambers devoid of the pressure compensation device, or all of the fluid chambers in the fluid reservoir body.

In some embodiments, each of discrete fluid chambers devoid of the pressure compensation device has a fluid volume ranging from about 200 microliters to about 1 milliliter.

In some embodiments, each of the one or more discrete fluid chambers devoid of the pressure compensation device further comprises a shelf for indicating a fluid fill volume limit.

In some embodiments, at least one of the two or more discrete fluid chambers containing the pressure compensation device also includes a fluid filter disposed between the pressure compensation device and the fluid supply via.

In some embodiments, the fluid reservoir body comprises a semi-transparent molded fluid reservoir body adjacent to the one or more discrete fluid chambers devoid of the pressure compensation device. In other embodiments, the fluid reservoir body includes indicia thereon in a transparent area of the fluid reservoir body for indicating a maximum fluid fill volume of the one or more discrete fluid chambers devoid of the pressure compensation device.

In some embodiments, there is provided a digital dispense system that includes a pipette-fillable fluid reservoir body to which a fluid ejection head substrate is attached. The fluid reservoir body includes two or more discrete fluid chambers therein. At least one of the two or more discrete fluid chambers contains a pressure compensation device and at least another one of the two or more discrete fluid chambers is devoid of a pressure compensation device. Each of the two or more discrete fluid chambers is in fluid flow communication with a fluid supply via, and each of the two or more discrete fluid chambers have sidewalls and a bottom wall attached to the side walls, wherein the bottom wall slopes toward the fluid supply via. An ejection head support face is provided in fluid flow communication with two or more discrete fluid chambers for attachment of a fluid ejection device to the ejection head support face for ejecting fluid from the two or more discrete fluid chambers.

An advantage of the disclosed embodiments is that it provides unique low-cost cartridges for digitally dispensing fluids that can be used for a variety of fluid dispense applications and can be adapted to a wide variety of fluids to be dispensed. The cartridges also have the advantage of providing at least one pressure compensated chamber that can be pre-filled or filled by a user to provide a relatively large volume of testing fluid. Pressure compensation in at least one of the fluid chambers allows full use of the volume of the fluid chamber without fluid drooling from the ejection head and flooding the ejection head with fluid. Accordingly, pressure compensation prevents drooling of fluid from the ejection head which negatively impacts the performance of the ejection head to dispense fluid. The non-pressure compensated fluid chambers can be filled with a pipette at the time of use to provide a predetermined amount of fluid to be ejected from the ejection head.

Unlike products that use a separate fluid ejection head chip for each fluid reservoir, a single fluid ejection head chip is attached to the body of the cartridge and is used for multiple fluid reservoirs. Using a single fluid ejection head chip improves the positional accuracy of the fluid droplets expelled from the ejection head.

DETAILED DESCRIPTION OF EXEMPLARY EMBODIMENTS

Figure 1:
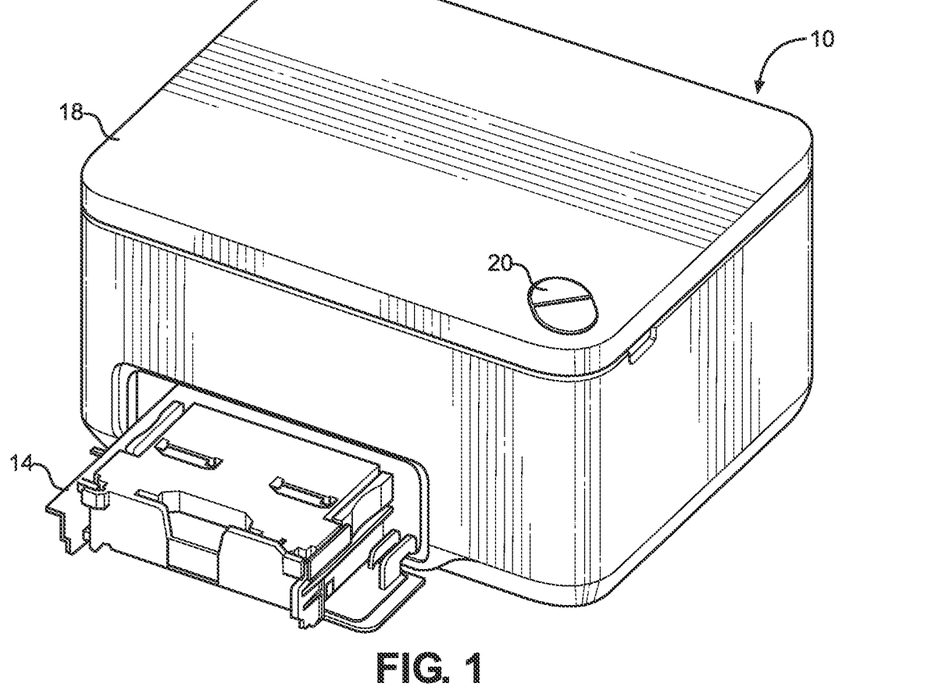
FIG. 1 is a perspective view, not to scale, of a digital dispense system according to an embodiment of the disclosure.
Figure 2:
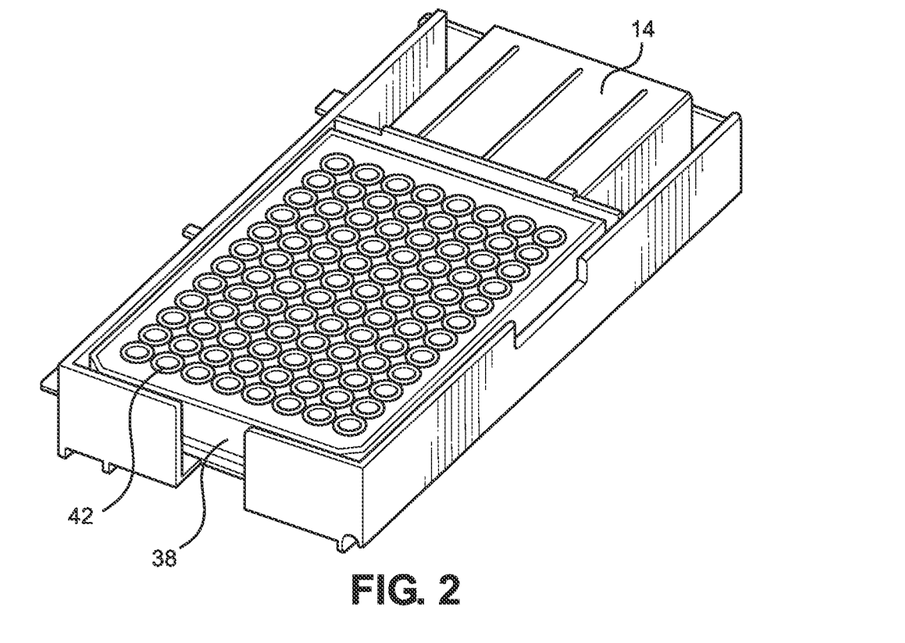
FIG. 2 is a perspective view, not to scale, of adapters for slides and microwell plates for use with the digital dispense system of FIG. 1.

With reference to FIGS. 1-2 there is shown a digital dispense device 10 for accurately dispensing an amount of one or more fluids onto a substrate. Unlike the high-end digital dispense devices, the device 10 of the present invention is based on an ejection head that moves back and forth in a first x direction and a tray 14 for moving a substrate that moves back and forth in a second y direction orthogonal to the first direction during the fluid dispense operation. The disclosed device 10 can accept open and closed dispense heads rather than just open dispense heads. The tray 14 is adaptable to a wide variety of substrates including, but not limited to, micro-well plates, glass slides, electronic circuit boards and the like. FIG. 2 illustrates a tray 14 for holding a micro-well plate 38 containing wells 42 therein for use with the digital dispense device 10 to dispense fluid into the wells 42 of the micro-well plate 38 or onto the glass slides. The tray 14 may include adapters for different size micro-well plates or for holding glass slides or other substrates for deposit of fluid thereon.

The dispense head cartridge containing a fluid ejection head and a cartridge movement mechanism are contained in a rectangular prism-shaped box 18. An activation switch 20 is included on the box 18 for activating the device 10. A rear side of the box 18 includes an opening for movement of the tray 14 through the box 18 in the second direction to dispense fluid onto a substrate. A USB port is provided on the box 18 to connect the digital dispense system 10 to a computer or a digital display device. Power is provided to the system 10 through a power input port on the box 18.

Figure 3:
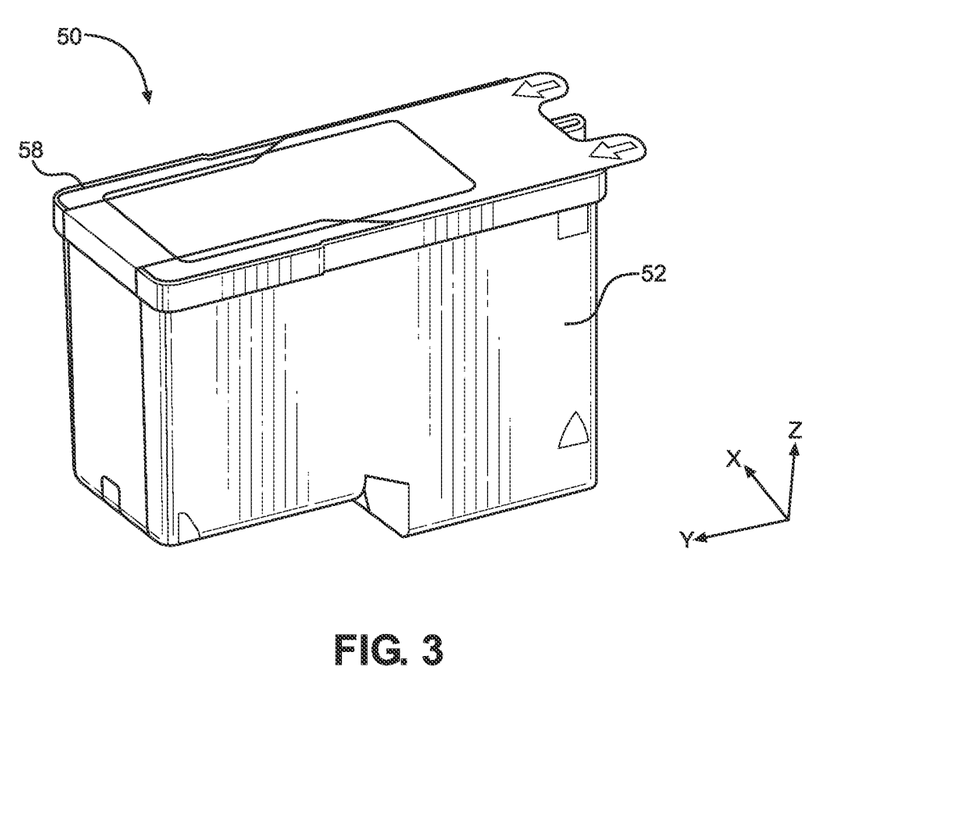
FIG. 3 is a perspective view, not to scale, of a pipette fillable cartridge according to an embodiment of the disclosure.

Fluid cartridges and components thereof for use with the digital dispense device 10 of FIG. 1 are illustrated in FIGS. 3-20. FIG. 3 is a perspective view, not to scale of a pipette-fillable fluid cartridge 50 according to one embodiment of the disclosure. An advantage of the pipette-Tillable fluid cartridge 50 described herein is that the cartridge 50 has substantially the same size dimensions as that of a conventional ink jet printer cartridge. Accordingly, the digital dispense device 10 described above, may include conventional ink jet printing hardware and software adapted for moving the tray 14 containing a micro-well plate 38 or glass slides through the device 10.

Figure 4:
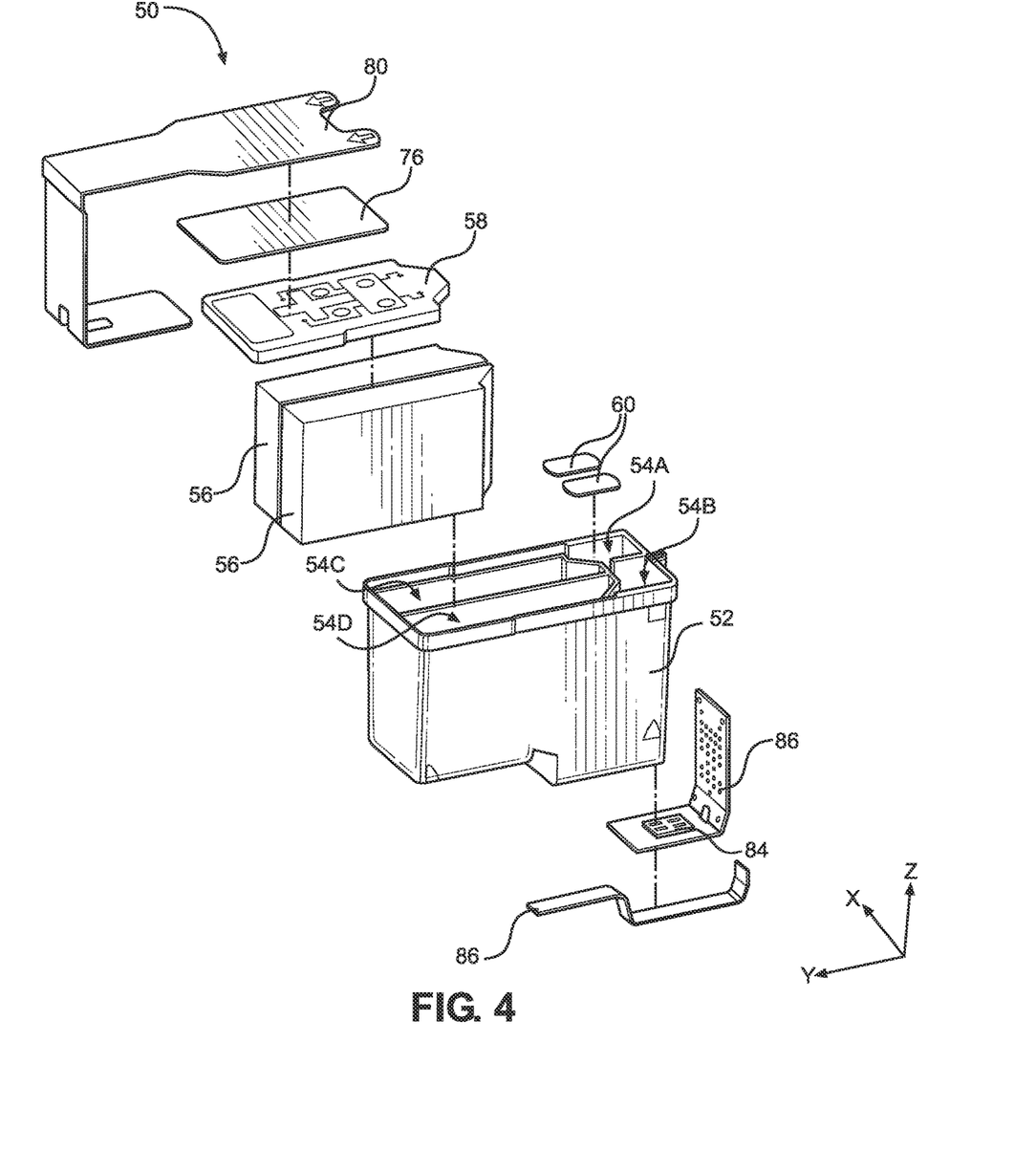
FIG. 4 is an exploded perspective view, not to scale, of the pipette fillable cartridge of FIG. 3.

As shown in the exploded view of FIG. 4, the cartridge 50 has a molded body 52 that provides two or more fluid chambers 54A, 54B, 54C, and 54D therein. At least one of the fluid chambers 54A-54D contains a pressure compensation device 56 such as a melamine foam or felt insert or a spring-assisted bladder (not shown). In the example shown in FIG. 4, each of the fluid chambers 54C and 54D contains a pressure compensation device 56. In some embodiments, fluid chambers 54C and 54D also contain a fluid filter 60 attached to a filter tower 62C-62D (FIG. 5) in fluid flow communication with the pressure compensation device 56 and fluid supply vias for providing filtered fluid to a fluid ejection head 84. In other embodiments, only one of the fluid chambers 54C or 54D contains the pressure compensation device 56. In other embodiments, there is a single fluid chamber 54C containing the pressure compensation device 56. In other embodiments, the cartridge contains three chambers containing the fluid compensation device 56 and one chamber that is devoid of the pressure compensation device. For simplicity purposes, the cartridge 50 having two chambers 54C and 54D containing pressure compensation devices and two chambers 54A and 54B devoid of a pressure compensation device will be described.

In order to prevent fluid from leaking, drying out or spilling from the pressure compensated fluid chambers 54C and 54D, a cover 58 is fixedly or removably attached to the body 52 of the fluid cartridge 50. In some embodiments, the cover 58 may be a snap-fit or press-fit cover 58. In other embodiments, the cover 58 may be permanently attached to the molded body 52 after the chambers 54C and 54D are filled with fluid. Accordingly, fluid chambers 54C and 54D may be prefilled with a testing or buffer fluid such as phosphate-buffered saline (PBS) or any other common biochemical test fluid. If the removable cover 58 is used, the chambers 54C and 54D may be filled by the user with the buffer or test fluid prior to use of the cartridge 50. One or more of the remaining fluid chambers 56A and 56B devoid of the pressure compensation device 56 may be filled and/or refilled with a fluid from a pipette at the time of use of the cartridge 50.

Figure 5:
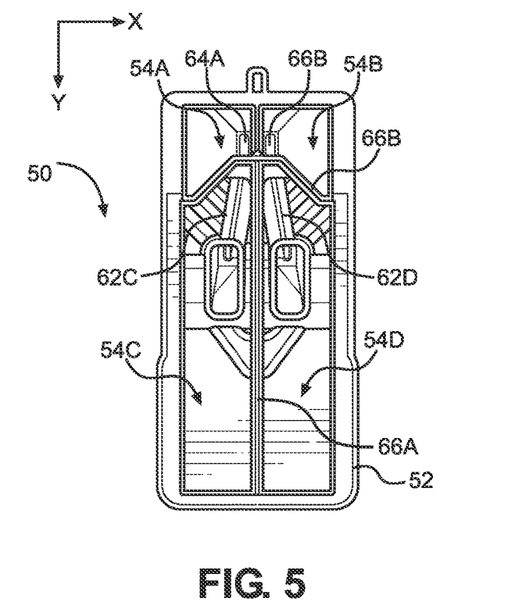
FIG. 5 is a top plan view, not to scale, of the pipette fillable cartridge of FIG. 3 showing filter towers therein.
Figure 6:
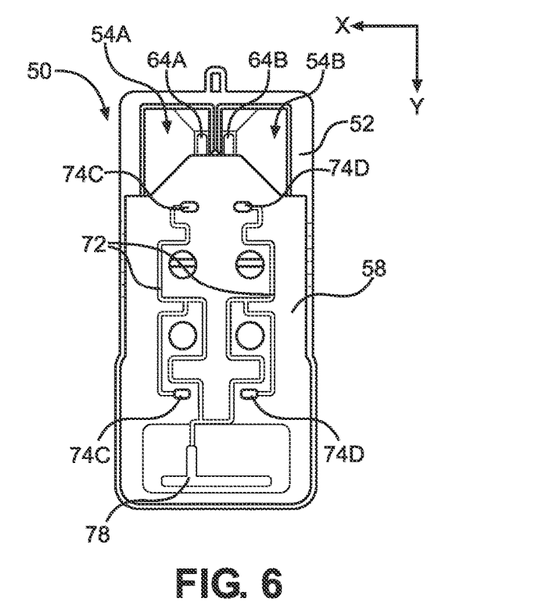
FIG. 6 is a top plan view, not to scale, of the pipette fillable cartridge of FIG. 3 with a cover attached over pressure-compensated chambers of the cartridge.
Figure 7:
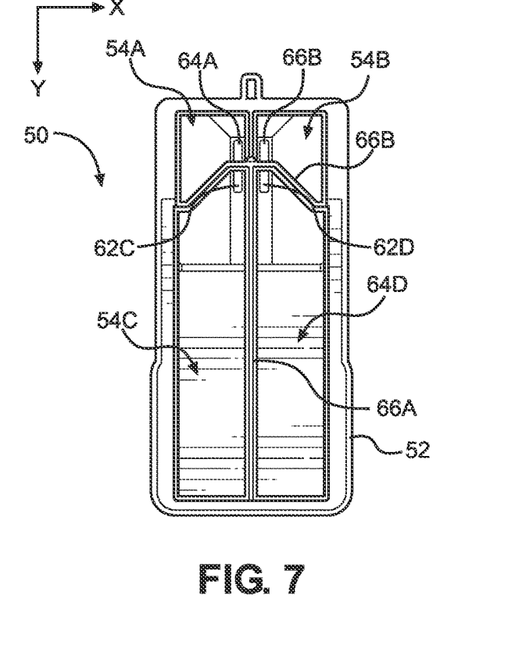
FIG. 7 is a top plan view, not to scale, of the pipette fillable cartridge of FIG. 3 showing fluid vias in fluid chambers of the cartridge.
Figure 8:
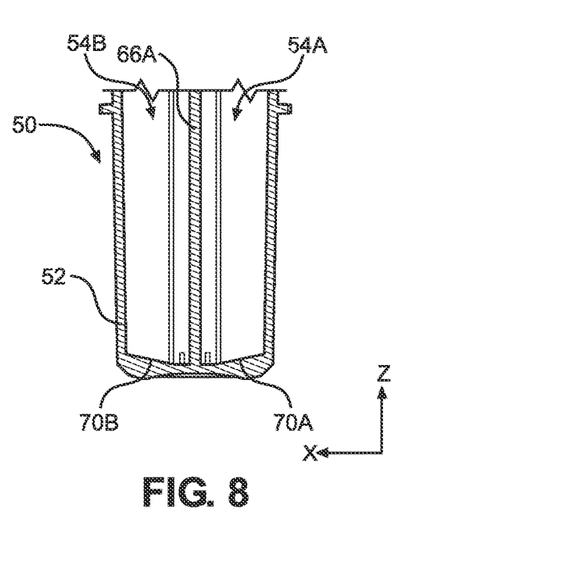
FIG. 8 is a cross-sectional, elevational view, not to scale of the pipette fillable cartridge of FIG. 3 showing slanted bottom walls of fluid chambers.

FIGS. 6 and 7 are top down views of the cartridge 50 with and without the cover 58 in place. As can be seen in FIGS. 6 and 7, there is a fluid supply via 64A, 64B, 64C, and 64D associated with each of the chambers 54A-54D. Fluid Supply vias 64C and 64D are in flow communication with the filter towers 62C and 62D as shown in FIG. 5. Dividing walls 66A and 66B separate the chambers 54A-54D from one another. Bottom walls of each of the chambers 54A-5D are sloped toward the fluid supply vias 64A-64D. FIG. 8 is a front end, cross-sectional view, of the cartridge 50 illustrating the slope of the bottom walls of chambers 54A and 54B. The slope of the bottom walls 70A and 70B relative to horizontal planes in the x and y directions may range from about 4 to about 20 degrees, such as from about 6 to about 12 degrees relative to planes in the x and y directions that are orthogonal to the dividing wall 66A.

Referring again to FIG. 6, the cover 58 may also contain serpentine air-flow paths 72 to aid in venting air from the covered chambers 54C and 54D during storage and use of the cartridge to prevent over-pressurization of the chambers 54C and 54D. Air inlets 74C and 74D provide air flow communication between the chambers 54C and 5D and the air flow paths 72. The air flow paths are typically covered by a non-removable tape 76 (FIG. 4). A terminal end 78 of the air flow paths 72 is vented to the atmosphere.

Figure 9:
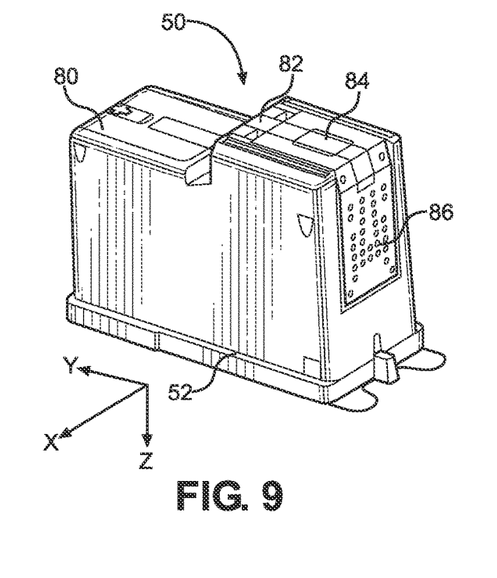
FIG. 9 is a bottom perspective view, not to scale, of the pipette fillable cartridge of FIG. 3 showing removable tapes thereon.
Figure 10:
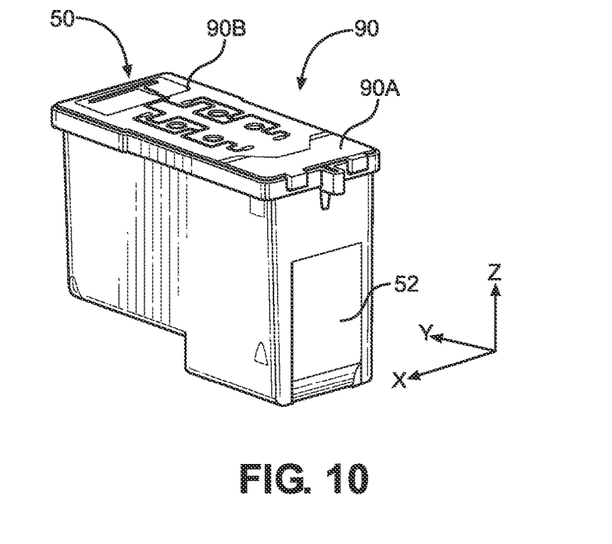
FIGS. 10-11 are top perspective views, not to scale, of the pipette fillable cartridge of FIG. 3 showing a hinged cover according to an embodiment of the disclosure.
Figure 11:
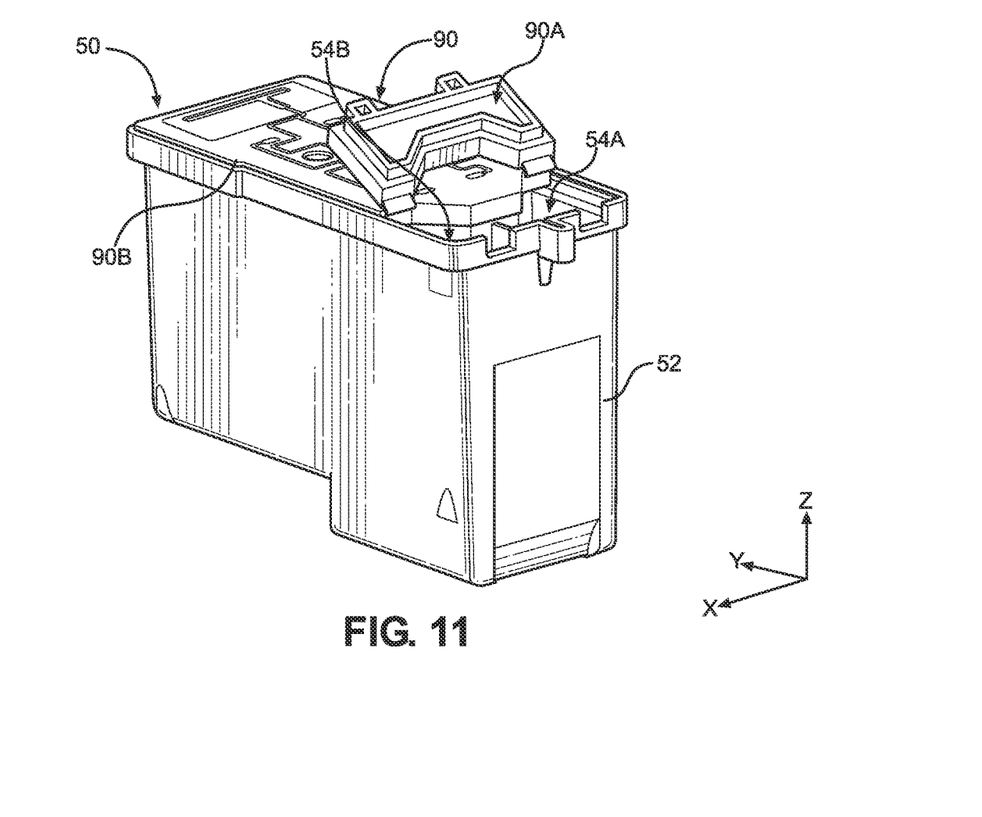

Referring again to FIG. 4, a pull tape 80 is removably attached to the cartridge 50 to cover the open fluid chambers 54A and 54B during shipping and storage of the cartridge 50. The pull tape 80 is attached to an ejection head protection tape 82 that covers the ejection head 84 prior to use of the cartridge 50. The ejection head 84 is attached to the cartridge body 52 adjacent the fluid supply vias 64A-64D and to a flexible circuit 86 that provides power to the ejection head 84. The flexible circuit 86 is also attached to a front side of the cartridge body 52. FIG. 9 provides a bottom view of the cartridge 50 with the pull tape 80, ejection head tape 82, ejection head 84, and flexible circuit 86 attached to the cartridge body 52.

Figure 12:
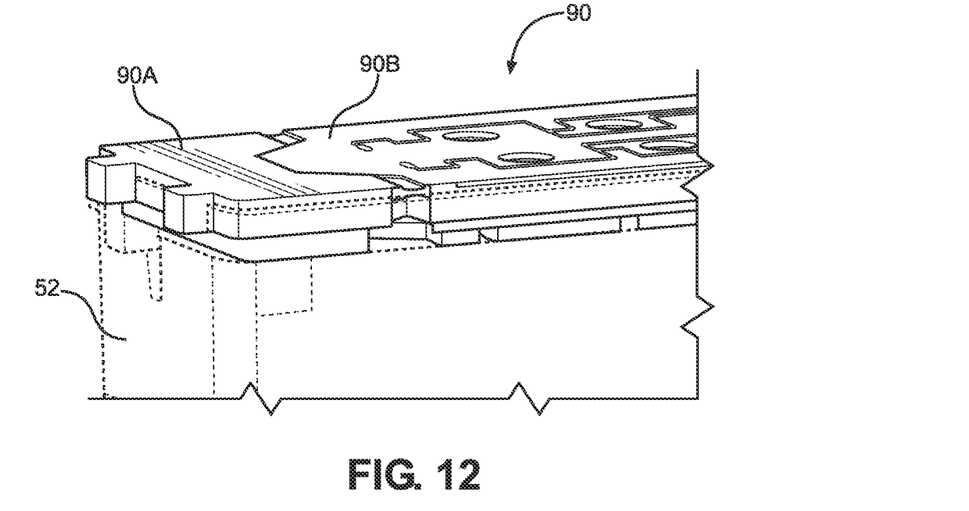
FIGS. 12-13 are close-up perspective views, not to scale, the hinged cover of the pipette fillable cartridge of FIGS. 10 and 11.
Figure 13:
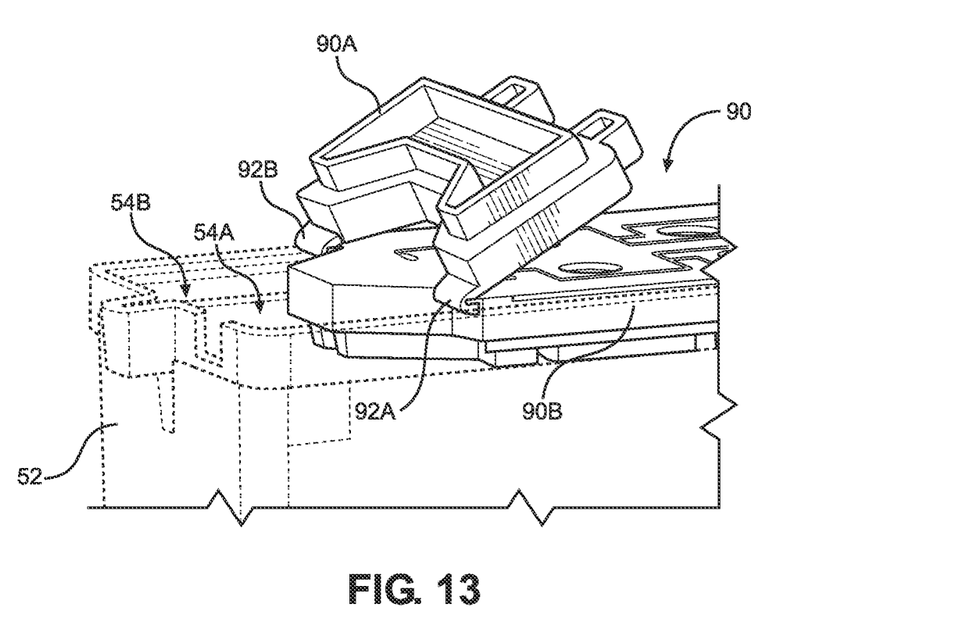

In another embodiments, illustrated in FIGS. 10-13, a cover 90 having a hinged portion 90A and a fixed portion 90B is attached to the body 52 of the cartridge 50 described above. The hinged portion 90A is configured to cover pipette chambers 54A and 54B to protect the chambers from dust and debris. If highly volatile fluids are inserted into chambers 54A or 54B, the hinged portion 90A may also prevent or reduce evaporation of the fluid from the chambers. The hinged portion 90A of the cover 90 may be snap-fit or press-fit to the body 52 of the cartridge 50. When the chambers 54A and 54B are sealed with the hinged portion 90A as shown in FIG. 12, the hinged portion 90A lies in the same plane as the fixed portion 90B of the cover 90. Accordingly, the cover portions 90A and 90B have substantially the same thickness. However, where the portion 90A joins the portion 90B, the cover material is thinned to provide hinges 92A and 92B as shown in FIG. 13. In other embodiments, a single wide hinge may be used rather than two hinges, as shown. Accordingly, the entire cover 90 may be molded from a single resilient plastic material. The fixed portion 90B of the cover may be welded or glued to the body 52 of the cartridge, or, in some embodiments, may be removably attached to the body 52 of the cartridge. During use, the hinged portion 90A may be flipped up so that fluid(s) can be pipetted into the chambers 54A and/or 54B.

Figure 14:
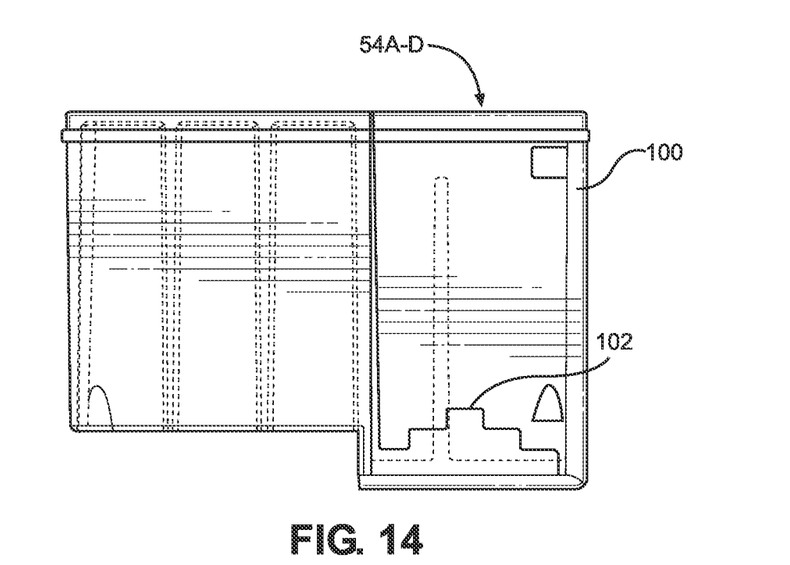
FIG. 14 is a side elevational view of an alternative pipette fillable cartridge according to the disclosure.

In some embodiments, as shown in FIG. 14, the cartridge body 100 may be made of a transparent or translucent material so that a level of fluid in chambers 54A-54D may be determined when the chambers are covered by cover 90. Accordingly, indicia 102 may be etched or otherwise inscribed on an external sidewall of the cartridge body 100 so that the fluid level in chambers 54A-D may be readily determined.

Figure 15:
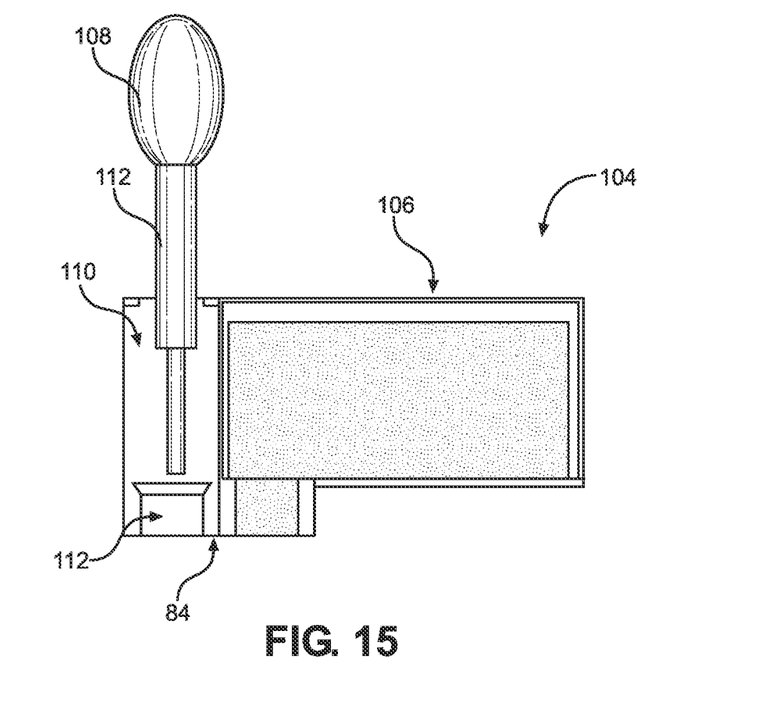
FIGS. 15-20 are schematic illustrations of pipette fillable cartridges containing different fluids according to embodiments of the disclosure.
Figure 16:
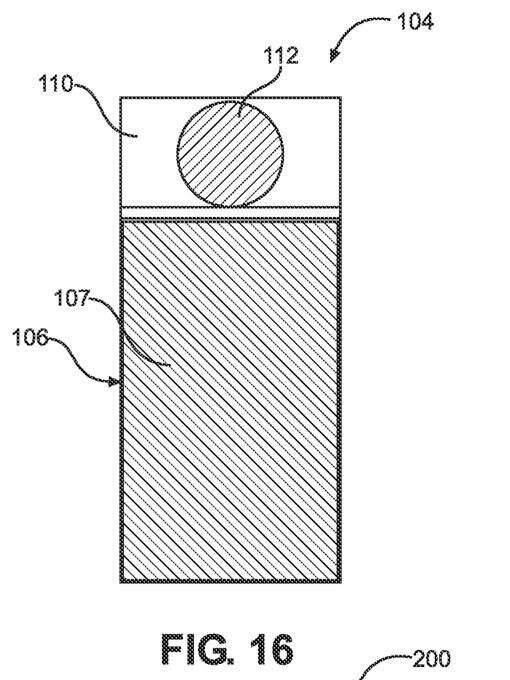

Methods for using the pipette fillable cartridges described above are illustrated schematically in FIGS. 15-20. A side schematic view of a cartridge 104 containing at least one closed, pressure compensated chamber 106 is illustrated in FIG. 15. The pressure compensated chamber(s) 106 include a melamine foam or felt or a bladder to provide backpressure control of fluid in chamber 106. Chamber 106 is in direct flow communication with the ejection head 84 and is pre-filled or filled on site with fluid 107. A pipette 108 may be used to fill the open chamber 110 with a fluid 112 as shown. FIG. 16 is a top plan view of cartridge 104 showing pressure compensated chamber 106 containing fluid 107 and open chamber 110 containing pipetted fluid 112. Accordingly, cartridge 104 may be used when only two fluids are required for a particular analysis. It will be appreciated that chamber 106 may be two chambers rather than a single chamber, both containing a pressure compensation device as described above.

Figure 17:
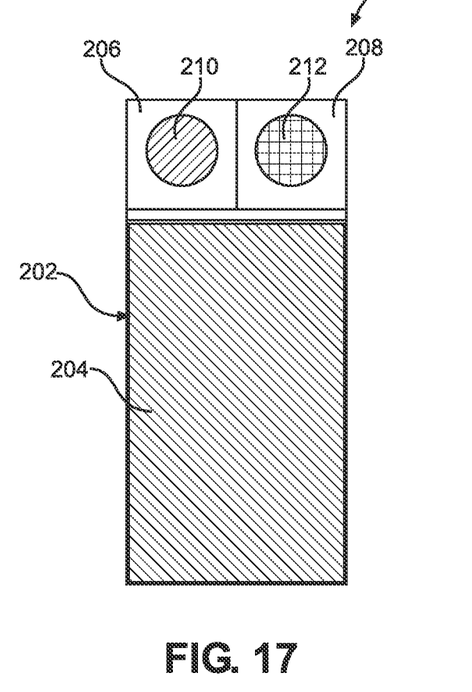

In FIG. 17, the cartridge 200 has three fluid chambers. The cartridge 200 includes a single or dual closed chamber 202 containing a pressure compensation device and a pre-filled or user filled fluid 204, and open chambers 206 and 208 for pipetted fluids 210 and 212 from the pipette device 108.

Figure 18:
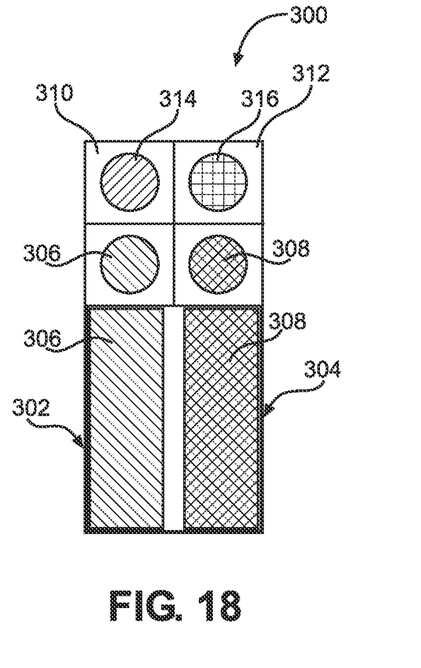
Figure 19:
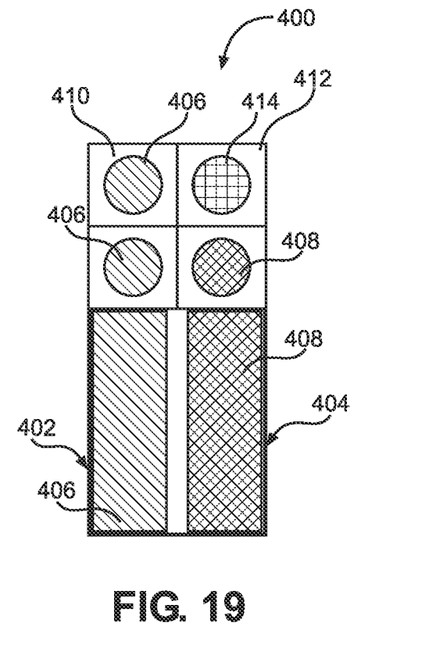
Figure 20:
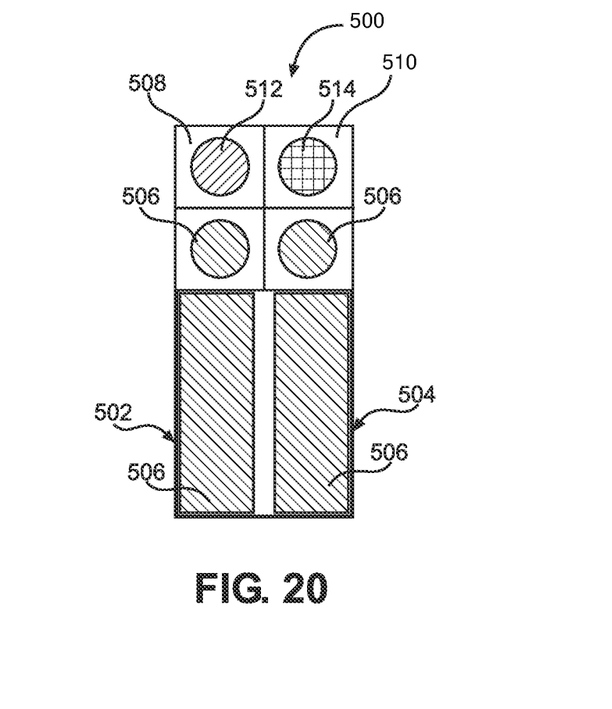

FIGS. 18-20 illustrate variations on the above cartridges, for ejecting 3 or 4 different fluids. Cartridge 300 contains closed, pressure compensated chambers 302 and 304 which may be prefilled or filled on site with different fluids 306 and 308 to from filter towers through fluid vias associated with chambers 302 and 304 as shown in FIG. 5. Chambers 310 and 312 may be filled from a pipette device 108 with fluids 314 and 316.

FIG. 19 illustrates a cartridge 400 for ejecting three different fluids. Cartridge 400 contains closed, pressure compensated chambers 402 and 404 which may be prefilled or filled on site with fluids 406 and 408. Unlike the embodiment in FIG. 18, chamber 410 may also be a closed chamber with a filter tower and filter leading from the pressure compensated chamber 402 to dispense fluid 406. In that case, there is a single open chamber 412 for fluid 414 from pipette 108. Thus, the cover, 90 described above, may be modified to have a single hinged portion that is openable over chamber 412. In other embodiments, both chambers 410 and 412 are open chambers and fluid 406 is pipetted into chamber 410 at the time of use of the cartridge.

FIG. 20 illustrates an alternate embodiment, for ejecting three different fluids from a pipette fillable cartridge 500. The cartridge 500 contains closed, pressure compensated chambers 502 and 504 which may be prefilled or filled on site with fluid 506. Open chambers 508 and 510 may be filled with fluids 512 and 514 from pipette 108 as described above. It will be appreciated that other variations of the pipette fillable cartridges, by those skilled in the art, may be contemplated within the scope of the foregoing descriptions.

In some embodiments, the digital dispense system 10 containing the pipette fillable cartridges described above may be used to deposit fluid into microwell plates. Filling of microwell plates for experimentation can be a time-consuming manual task. It is desirable to be able to deposit fluid into multiple wells at the same time to decrease the time required to prepare the microwell plate. Conventional digital dispense systems exist, however the conventional systems have dispense heads arranged in a linear fashion along a single axis. The dispense head chips containing fluid ejectors are placed individually on such dispense heads. The present disclosure provides an improved fluid dispense system 10 by combining multiple arrays of fluid ejectors disposed in a two-dimensional matrix on a single ejection head chip 84. Such two-dimensional matrix enables the time to fill wells in the microwell plate to be significantly decreased. The two-dimensional matrix may also improve registration between the fluid ejectors and the microwell plate since the ejection head containing the two-dimensional array of fluid ejectors is formed through photolithography techniques rather than mechanically placing individual ejection heads onto an ejection head substrate.

Accordingly, the digital dispense system 10 according to the disclosure can be used to deposit fluid into wells of a microwell plate, onto slides, onto circuit board substrates, or onto other substrates using the fluid cartridges described above. The ejection head chip 84 containing multiple arrays of fluid ejectors provides improved registration accuracy allowing for more precise filling of microwell plates, placement of droplets on a glass slide, or deposition of fluids on a circuit board substrate.

While the foregoing embodiments particularly described fluid cartridges having one to six fluid chambers, it will be appreciated that each fluid cartridge may be configured to dispense a single fluid, or two or more different fluids.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A pipette-fillable fluid reservoir body to which a fluid ejection head substrate is attached, the fluid reservoir body comprising:
   two or more discrete fluid chambers therein, wherein at least one of the two or more discrete fluid chambers contains a pressure compensation device selected from the group consisting of a melamine foam and a felt;
   two or more discrete fluid chambers therein, wherein at least one of the two or more discrete fluid chambers contains a pressure compensation device selected from the group consisting of a melamine foam and a felt and a cover permanently attached only to the portion of the fluid reservoir body containing the fluid chambers containing the pressure compensation device; and wherein at least another one of the two or more discrete fluid chambers is devoid of a pressure compensation device and is configured to hold fluid obtained from a fluid filled pipette, wherein each of the two or more discrete fluid chambers is in fluid flow communication with a fluid supply via, and wherein each of the two or more discrete fluid chambers have sidewalls and a bottom wall attached to the side walls, wherein the bottom wall slopes toward the fluid supply via; and
   an ejection head support face in fluid flow communication with two or more discrete fluid chambers for attachment of a fluid ejection device to the ejection head support face for ejecting fluid from the two or more discrete fluid chambers.

2. The pipette-fillable fluid reservoir body of claim 1, wherein the sloped bottom wall has an angle ranging from about 6 to about 12 degrees relative to a plane orthogonal to the sidewalls.

3. The pipette-fillable fluid reservoir body of claim 1, comprising four fluid chambers therein, wherein the four fluid chambers are separated from one another by dividing walls therebetween.

4. The pipette-fillable fluid reservoir body of claim 1, wherein the fluid reservoir body comprises a transparent fluid reservoir body.

5. The pipette-fillable fluid reservoir body of claim 4, wherein the fluid reservoir body further comprises indicia thereon for indicating a maximum fluid fill volume for each of the fluid chambers devoid of a pressure compensation device.

6. The pipette-fillable fluid reservoir body of claim 1, wherein a hinged cover section is disposed over one or more discrete fluid chambers devoid of a pressure compensation device.

7. The pipette-fillable fluid reservoir body of claim 1, wherein the cover permanently attached to the fluid reservoir body adjacent to the fluid chambers containing the pressure compensation device further comprises air vent channels therein.

8. The pipette-fillable fluid reservoir body of claim 1, further comprising a removable tape configured for covering the one or more discrete fluid chambers devoid of the pressure compensation device.

9. The pipette-fillable fluid reservoir body of claim 1, wherein each of the one or more discrete fluid chambers devoid of the pressure compensation device has a fluid volume ranging from about 200 microliters to about 1 milliliter.

10. The pipette-fillable fluid reservoir body of claim 1, wherein each of the one or more discrete fluid chambers devoid of the pressure compensation device further comprises a shelf for indicating a fluid fill volume limit.

11. The pipette-fillable fluid reservoir body of claim 1, wherein at least one of the two or more discrete fluid chambers containing the pressure compensation device further comprises a fluid filter disposed between the pressure compensation device and the fluid supply via.

12. The pipette-fillable fluid reservoir body of claim 1, wherein the fluid reservoir body comprises a semi-transparent molded fluid reservoir body adjacent to the one or more discrete fluid chambers devoid of the pressure compensation device.

13. The pipette-fillable fluid reservoir body of claim 12, wherein the fluid reservoir body further comprises indicia thereon in a transparent area of the fluid reservoir body for indicating a maximum fluid fill volume of the one or more discrete fluid chambers devoid of the pressure compensation device.

14. A digital fluid dispense system comprising the pipette-fillable fluid reservoir body of claim 1, wherein the pressure compensation device prevents drooling of fluid from the fluid ejection device during operation of the digital dispense system thereby improving accuracy of fluid dispensed into wells of a micro-well plate or onto glass slides.

* * * * *